Jan. 12, 1954    E. E. PRATHER    2,665,785
CLUTCH CONTROL MECHANISM
Filed June 24, 1949    2 Sheets-Sheet 1

INVENTOR
EDWIN E. PRATHER
BY H. V. Clayton
ATTORNEY

Jan. 12, 1954

E. E. PRATHER 2,665,785

CLUTCH CONTROL MECHANISM

Filed June 24, 1949

INVENTOR
EDWIN E. PRATHER
BY
H. V. Clayton
ATTORNEY

Patented Jan. 12, 1954

2,665,785

UNITED STATES PATENT OFFICE 2,665,785

CLUTCH CONTROL MECHANISM

Edwin E. Prather, South Bend, Ind., assignor to Bendix Aviation Corporation, South Bend, Ind., a corporation of Delaware Application June 24, 1949, Serial No. 101,027

7 Claims. (Cl. 192—.07)

This invention relates in general to power means for operating the friction clutch of an automotive vehicle, and more particularly to clutch operating pressure differential operated power means, the clutch engaging and disengaging operations of which are dependent upon the position of the accelerator pedal and the speed of the engine of the vehicle.

An object of my invention is to provide power means for operating the friction clutch of an automotive vehicle including a pressure differential operated motor controlled by a simple and compact unit; and it is an object of my invention to include in said unit an accelerator and motor operated pressure balanced valve mechanism operable in accordance with the position of the accelerator and the speed of the engine.

Yet another and important object of my invention is to provide, in the drive system of an automotive vehicle, power means for operating the friction clutch of the vehicle, the clutch engaging operation of said means, with a normal operation of the mechanism, being in accordance with the position of the accelerator of the vehicle; and said operation, with an abnormal operation of the mechanism for example when the engine fails to respond to the operation of the accelerator, being controlled in accordance with the speed of the engine through the intermediary of a fluid pressure operated motor.

A further object of my invention is to provide, in the driving mechanism of an automotive vehicle, a pressure balanced follow-up type of three-way valve for controlling a clutch operating pressure differential operated motor, combined with means for operating said valve in the normal operation of the mechanism; together with means operable, with an abnormal operation of the engine during an operation of the clutch, to overrule the aforementioned valve operating means to thereby effect the desired clutch controlling operation of the motor.

My invention further contemplates the provision, in an automotive vehicle including an internal combustion engine and a friction clutch, of a clutch control mechanism wherein the loading of the clutch plates, to control the engagement and disengagement of the clutch, is in accordance with the torque output of the engine; thus with the mechanism of my invention should the engine unexpectedly begin to labor during the engagement of the clutch, the clutch mechanism of my invention comes into play to automatically effect a decrease in the loading of the clutch plates, resulting in a speeding up of the engine; or should the engine be suddenly speeded up during the engagement of the clutch due, say, to a slippage of the clutch plates, then the clutch operating mechanism of my invention automatically comes into play to increase the loading of the clutch plates, thereby decreasing the engine speed and effecting the desired acceleration of the vehicle.

The above and other advantages and features of the invention will appear more fully hereinafter from a consideration of the following description taken in connection with the accompanying drawings, wherein an embodiment of the invention is illustrated by way of example.

Figure 1:
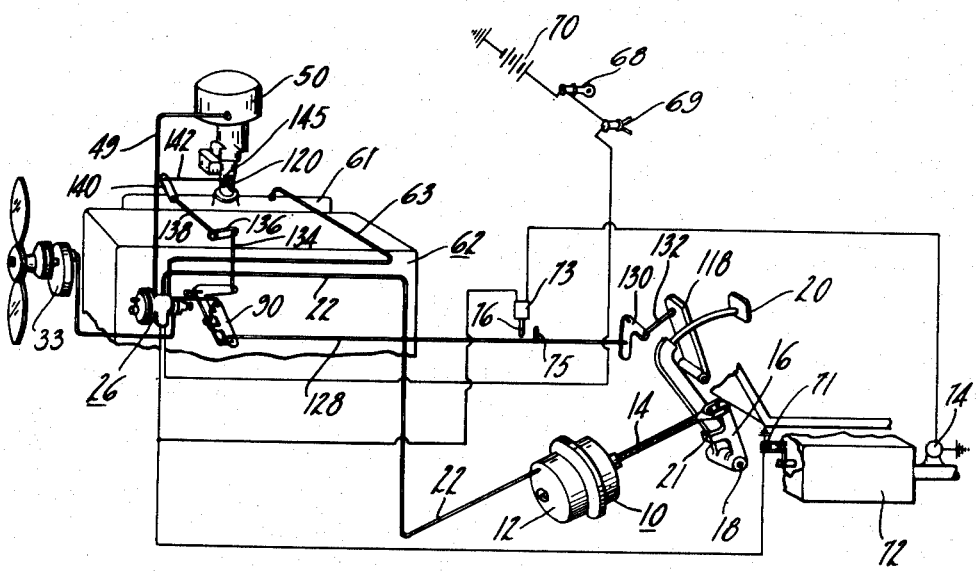
Figure 1 is a diagrammatic view disclosing the principal features of my invention.

Describing now that embodiment of my invention disclosed in Figures 1 to 5 inclusive of the drawings, the principal elements thereof consist of a single acting pressure differential operated motor 10 comprising a casing 12 and a power element such as a piston, not shown, which is connected to a friction clutch, not shown, of a conventional design. One end of the casing of the motor, a portion of the body thereof and the power element together outline a control chamber 13, the gaseous pressure within said chamber being controlled to control the operation of the motor. The force transmitting means interconnecting the power element of the motor with the clutch preferably includes a flexible cable 14 connected to a crank 16; and said crank is fixedly connected to a shaft 18 which is connected to the clutch. A foot operated clutch pedal 20, contactable with a flange 21 extending from the crank 16, is also preferably included in the clutch operating mechanism. The connection between the pedal 20 and the crank 16 provides a means for effecting a manual operation of the clutch; and the lost motion connection between the pedal 20 and crank 16 makes possible a power operation of the clutch without moving the clutch pedal.

Figure 3:
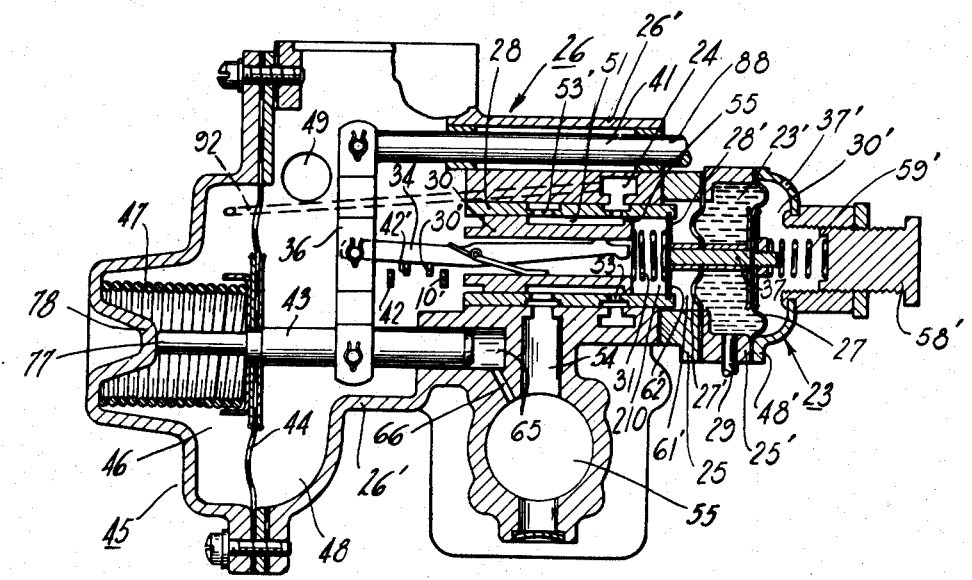
Figure 3 is a longitudinal sectional view taken on the line 3—3 of Figure 2 of the control valve mechanism of my invention.
Figure 2:
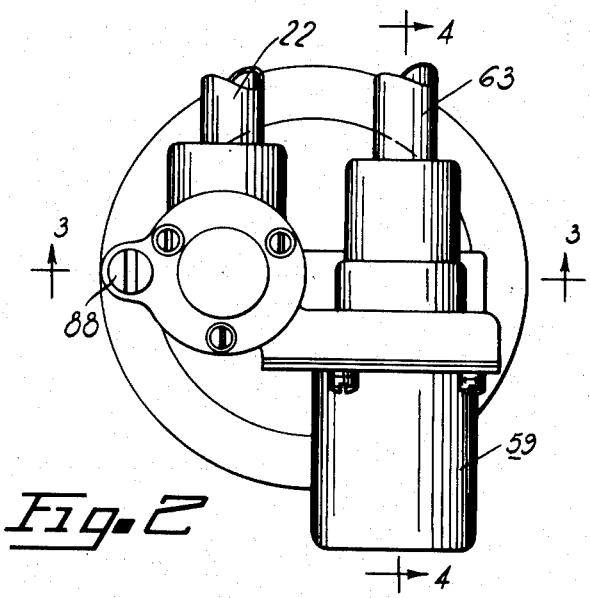
Figure 2 is a plan view looking at one end of the valve mechanism of my invention.
Figure 4:
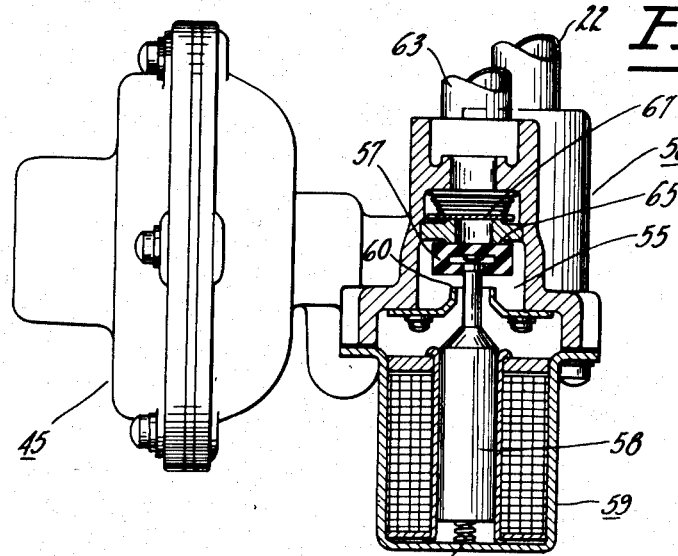
Figure 4 is a view partly in section, taken on the line 4—4 of Figure 2 disclosing details of the solenoid operated vacuum cutin valve of the valve mechanism.

One end of the motor 10, that is, the end of the same constituting a part of the aforementioned power compartment 13 of the motor, is connected by a conduit 22 to a compartment 24 of a control valve unit indicated as a whole by the reference numeral 26 and three different views of said unit are disclosed in Figures 2 to 4 inclusive. As is described in detail hereinafter this control unit 26 includes a valve mechanism and two different spring and pressure differential operated motors cooperating with the accelerator in operating said valve mechanism. The casing of the unit 26 is preferably of five parts, one of said parts, indicated by the reference numeral 26', being provided with a cylindrically shaped bore to receive a slidable cylindrical sleeve valve member 28 constituting one of the two parts of a three-way valve; and said casing is counterbored to provide the aforementioned compartment 24, Figure 3.

A spool shaped valve member 30, which is biased inwardly by a preloaded spring 31 and which is provided with a cylindrically shaped bore to permit the passage of air therethrough, constitutes the other part of the two part three-way valve. One end of the latter valve member, is provided with diametrically spaced openings to receive therethrough a pin 32 and said pin extends through a connecting pin 34, one end of which extends within the member 30. The other end of the pin 34 extends beyond the valve member 30 and is detachably and pivotally connected to a two-part lever 36. The end portion 38 of the pin 34 is preferably biased into engagement with the interior of the valve 30 by a coil spring 40. There is thus provided means for readily disconnecting valve 30 from the lever 36; for the pin 32 may be removed by driving the same through the pin 34, thereby separating the latter from the valve 30.

As is disclosed in Figure 3, the lever 36 is pivotally connected at one of its ends to a rod 41; and the other end of the lever 36 is pivotally connected to a pin 43 which preferably abuts a stop portion 43' of the valve casing; and the pin 43 is preferably secured at its other end to a flexible diaphragm 44. This diaphragm constitutes the power element of a valve operating spring and pressure differential operated motor indicated as a whole by the reference numeral 45; and the operation of said motor is in large measure controlled by the gaseous pressure within a control compartment 46 of said motor and by a compression spring 47 within said compartment. A compartment 48 of the motor 45 is vented to the atmosphere via a conduit 49 which leads to an air cleaner 50, Figure 2.

The most important feature of my invention lies in the provision of a spring and fluid pressure operated motor 23 which cooperates with the motor 45 and the accelerator 118 in the operation of the valve member 30. This motor 23 includes a three part casing and power elements 27 and 27', one of the casing parts, indicated by the reference numeral 25', receiving a conduit 29 which is preferably connected to the high pressure side of a water pump 33, Figure 1, constituting a part of the cooling system of the internal combustion engine 62 of the vehicle; and these power elements in part outline a motor control compartment 23'. A part 48' of the motor casing is ported at 37' to vent a motor compartment 38' to the atmosphere. The power elements 27 and 27' of the motor 23 are connected to the valve sleeve 28, by a rod 37 and a flange 28', the latter being provided with a port 62' to vent a motor compartment 61' to the atmosphere via the interior of the valve member 30. The rod 37 is biased to the left, Figure 3, by a spring 59' which is loaded by a nut 58' adjustably mounted in the end of the control unit 26. Now as is disclosed in Figure 3 the power element 27 is of larger area than the power element 27' accordingly when water is forced into the compartment 23' the rod 37 and the sleeve valve 28 connected thereto are biased to the right by the difference in forces exerted by the two power elements.

Continuing the description of the valve mechanism 26, the valve member 30 is recessed at 51 and the end of said member provides a land portion 52 which is adapted, in the operation of the the valve, to be positioned to register the recess 51 with ports 53 in the sleeve valve member 28. The valve member 30 is also operated so that the land portion 52 covers the ports 53, that is, laps the valve; and said member is also operated to interconnect said ports with the air cleaner 50 via the motor compartment 48 and the interior of the valve member 30.

The sleeve valve member 28 is provided with an opening 53' to register with one end of a duct 54 in the valve casing, said duct being connected at its other end with a chamber 55 of a three-way vacuum cutin valve indicated as a whole by the reference numeral 56 and disclosed in detail in Figure 4. The latter valve includes a valve member 57 secured to one end of an armature 58 of a solenoid 59. When the solenoid 59 is energized the valve member 57 moves downwardly, Figure 4, to seat at 60, thereby connecting the motor 10 with the intake manifold 61 of the internal combustion engine 62 of the vehicle via a conduit 63, the aforementioned chamber 55, the port 53', the valve recess 51, the port 53, the chamber 24 and the conduit 22; and when the solenoid 59 is de-energized, a spring 64 serves to move the armature upwardly, Figure 4, to seat the valve member 57 at 65, thereby cutting off the vacuum connection and venting the motor 10 to the atmosphere via the air cleaner 50, chamber 48 of the motor 45, a recess 65 in the valve casing which houses the outer end of the pin 43, a duct 66 in the valve casing, the chamber 55, the valve port 53, valve compartment 24 and the conduit 22. A spring loaded check valve 67 may be included in the vacuum connection between the intake manifold and the valve chamber 55 thereby providing a means for maintaining the clutch disengaged in the event the conduit 63 is broken when the motor 10 is energized.

Completing the description of the valve unit 26 the casing port 26' is provided with a duct 92, Figure 3, permanently interconnecting the control compartment 46 of the motor 45 with the aforementioned valve compartment 24. There is thus provided fluid transmitting means for at all times interconnecting the motor compartment 46, the valve compartment 24, and the control compartment 13 of the clutch operating motor 10. It follows therefore that the operation of the clutch control mechanism constituting my invention is in a measure controlled by controlling the gaseous pressure within the valve compartment 24.

There is thus provided a compact valve control unit 26 comprising a multi-sectioned casing housing a three-way control valve 28, 30 and means for operating said valve comprising the spring and fluid pressure operated motor 23, the spring and fluid pressure operated motor 45, and an accelerator operated pin 41, said pin and the power element 44 of the motor 45 being connected with the movable part 30 of said valve by means of a floating lever member 36.

Describing now the force transmitting means interconnecting the accelerator 118 of the car with a throttle operating crank 120 and with the valve operating pin 41, said pin is connected to a rod 88; and this rod is pivotally connected with a lever member 90. The lower end of this lever member is pivotally mounted upon a floating pin 122 and one end of this pin is mounted in one end of a bell crank lever 124 which is pivotally mounted upon a fixed pin 126. The lever member 90 is connected to the accelerator 118 by means of a rod 128, a bell crank lever 130 and a link 132, all as disclosed in Figure 1; and as disclosed in the latter figure, the bell crank lever 124 is connected to the throttle valve of the carburetor by means of a link 134, a crank 136, a rod 138, a crank 140, a link 142 and the crank 120. A spring 144, which is weaker than a throttle return spring 145 and stronger than the valve spring 31, is operative, together with the spring 145, to return the accelerator to its throttle closed position and to move the valve member 30 to the right to the position disclosed in Figure 3 to open the three-way valve 28, 30, that is operate the same to effect a clutch disengaging operation of the motor 10. The spring 144 is preferably sleeved over the pin 122 and is connected at its ends to the levers 90 and 124. The operation of this part of the mechanism of my invention will be described in greater detail hereinafter when the operation of the entire clutch control mechanism is described in detail.

Describing now a feature of my invention, the solenoid 59 which operates the vacuum cutin valve 56, is controlled by the electrical controls disclosed in Figure 1. Describing this mechanism a grounded battery 70 is wired in series with an ignition switch 68, a clutch control cutout switch 69 preferably mounted in the instrument panel of the vehicle, the solenoid 59, and a grounded switch 71 which is opened by the second and high gear shift rail of the transmission 72 when the transmission is established in its high gear setting. With this electrical hookup the valve 56 is opened, that is the valve member 57 is seated at 60, when the switches 68 and 69 are closed and the transmission is established in any gear except high gear; accordingly, with the vacuum cutin valve opened there is provided a source of vacuum to make possible a clutch disengaging operation of the motor 10 when the accelerator is released to open the valve 28, 30 an operation which is described in detail hereinafter.

With the vehicle traveling in high gear it is desirable to automatically disengage the clutch when the accelerator is released and the speed of the vehicle is appreciably reduced, for example when the vehicle is being driven very slowly in traffic or in a funeral procession; and to effect this operation of the mechanism of my invention there is provided a switch 73 which is closed when the accelerator is released to close the throttle, and a grounded switch 74 which is operated by a vehicle speed responsive governor, not shown. To effect the operation of the switch 73 there is provided a flange 75 on the rod 128, said flange being contactable with a switch operated member 76.

As is disclosed in Figure 1 the switches 74 and 73 are electrically connected in series in an electrical circuit which is wired in parallel with the grounded transmission operated switch 71. Preferably the switch 73 is so constructed and so operated by the flange 75 that the same is closed just prior to the complete closing of the throttle valve; and it follows, therefore, that the switch 73 is not opened until after the throttle has been opened to a limited degree.

Figure 5:
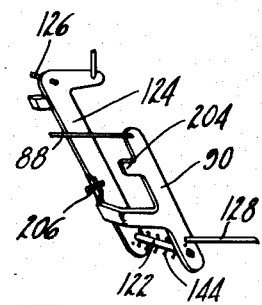
Figure 5 is a view disclosing the principal parts of the connection interconnecting the accelerator, the throttle and the control valve.

Describing now the complete operation of the mechanism constituting my invention and incidentally completing the description of the parts thereof not heretofore described, when the accelerator 118 is completely released to idle the internal combustion engine 114 and move the lever 90 to the position disclosed in Figure 5, the intake manifold 61 of said engine is partially evacuated. There is thus provided a source of vacuum for energizing the motor 10 to disengage the friction clutch of the motor vehicle; and this operation is effected inasmuch as with the release of the accelerator the movable three-way member 30 is moved to place said motor in air transmitting connection with the manifold. The valve member 30 and the means for operating the same then assume the relative positions disclosed in Figure 3, the spring 47 being compressed by the operation of the power element 44 and the spring 59′ being compressed by the operation of the power elements 27 and 27′. The ports 53 and 53′ being connected air is then withdrawn from the clutch motor and the motor compartment 46 into the intake manifold via the conduit 63, the valve compartment 55, the duct 54 interconnecting the compartment 55 with the port 53′, Figure 3, recess 51, ports 53, the compartment 24, the duct 92 interconnecting the compartment 24 with the valve motor compartment 46, and the conduit 22 interconnecting the compartment 24 with the control chamber of the clutch motor 10.

The compartment 46 being then partially evacuated the diaphragm 44 is moved, by the differential of pressures acting on the same, to the position disclosed in Figure 3 the end of the pin 43 abutting the stop 78; for the gaseous pressure within the compartment 46 is at this time the same as that within the intake manifold of the idling engine and this gaseous pressure is of course the same as that within the control compartment of the then energized clutch operating motor 10. It is to be noted that in the clutch disengaged position of the parts the valve member 30 is moved to the position disclosed in Figure 3 that is a position just short of a closing off of the ports 53 by the flanged end of said valve member, that is, the land 52. It is also to be noted that with the engine idling the sleeve valve member 28 assumes the position disclosed in Figure 3 the force exerted by the water within the motor compartment 23′ balancing the force exerted by the compressed spring 59′.

Now it is to be noted that the air transmitting connection with the intake manifold is made possible by virtue of the fact that the valve member 57 of the vacuum cutin valve unit 56 is at the time removed from a seat 65; for the solenoid 59 which actuates said valve member is at the time energized to move the armature 58 and the valve member 57 connected thereto downwardly, Figure 4. Explaining this operation the solenoid 59 is at this time energized by virtue of a closing of the grounded breaker switch 74; for inasmuch as the car is at a standstill the vehicle speed responsive governor, not shown, is then operative to close said switch. The governor is so constructed that when the vehicle is at a standstill or is traveling below a relatively low speed, say ten miles per hour, then the governor is operative to close the grounded switch 74 thus completing an electrical circuit including the switch 74, the then closed accelerator operated switch 73, the solenoid 59, the cutout switch 69, the ignition switch 63 of the vehicle and the grounded battery 70.

Continuing now the description of the cycle of clutch control operations of the motor 10, said motor having been energized to disengage the clutch the driver will then probably wish to establish the change speed transmission of the vehicle in a relatively low gear setting. This is, of course, done by moving the transmission controlling selector lever, not shown, to its low gear position.

Continuing now the description of the cycle of operations of the clutch control mechanism, the power plant of the vehicle is now prepared to effect a forward movement of the vehicle accordingly the driver depresses the accelerator to open the throttle and effect a clutch engaging operation of the clutch operating power means. Describing the latter operation with the first increment of movement of the accelerator the lever 90 is rotated counterclockwise about the pin 122 as a fulcrum, this operation being made possible by virtue of the fact that the spring 144 is weaker than the throttle spring 145 and the latter spring is strong enough to prevent the rotation of the lever 124. In this operation the lever 90 moves counterclockwise until a flange 204 at the upper end of the same contacts an adjustable stop 206 on the lever 124; and this movement of the lever 90 results in a movement of the rod 88 to the left, Figure 3, to rotate the lever member 36 about its pivotal connection with the pin 43 as a fulcrum. The valve member 30 is thus moved to the left, Figure 3, the lever 36 operating as a lever of the second class to place the valve ports 53 in communication with a valve chamber 210 which chamber is at all times connected to the atmosphere via the interior of the valve member 30 and the valve compartment 48 which is vented to the atmosphere via the air cleaner 50. It is to be noted that in this initial operation of the valve the degree of movement of the valve member 30 is greater, preferably about twice as great, as the degree of movement of the rod 128 connected to the accelerator. As will be brought out in the description that follows there is thus provided a valve operating mechanism operative to quickly effect the first stage operation of the motor 10 during the first increment of depression of the accelerator, said increment being relatively small. It is to be remembered that there is neither an opening of the throttle nor an opening of the switch 73 during this movement of the accelerator.

The valve member 30 having been moved to the left to vent the valve compartment 24 to atmosphere there results a relatively rapid flow of air into both the control compartment 13 of the clutch operating motor 10 and the compartment 46 of the valve operating motor 45; and this flow of air results in a first stage clutch engaging operation of the motor 10. Describing this operation, the power element of the motor 10 is moved to the right, Figure 1, by the clutch springs and when said springs have expanded sufficiently to bring the clutch plates just short of engagement with each other, the movement of the power element is arrested; however, it will be obvious that the parts of the mechanism of my invention may be constructed and arranged to effect a slight loading of the clutch plates when the first stage of clutch engaging operation of the mechanism is completed.

Explaining this arresting operation the clutch springs, by their expansion, serve to maintain a relatively low gaseous pressure, that is, vacuum, within the control chamber 13 of the motor 10. Now inasmuch as said control chamber is at all times connected to the valve chamber 24 and motor chamber 46 it follows that the gaseous pressure within said chambers is also maintained relatively low by virtue of the expansion of the clutch springs. During the expansion of the clutch springs the diaphragm 44 moves to the right, Figure 3, to effect a lapping of the three-way valve 28, 30. Describing this operation of the valve member 30 moves to the right until the land portion 52 of said valve member registers with the ports 53; and when this occurs the flow of air into the chamber 46 and the motor 10 is automatically cut off and the system is then in equilibrium.

In this operation the lever 90 rotates counterclockwise about the pivotal connection between the pin 122 and said lever, said pivoted connection acting as a fulcrum. As stated above, the parts of the mechanism of my invention are preferably so constructed and arranged, particularly the strength or load of the clutch springs, and the area of the diaphragm 44 that the valve is lapped to arrest the movement of the power element of the clutch motor when the clutch plates are just short of contact with each other.

This operation of the motor 10 is usually described as the first stage operation thereof and it is to be particularly noted that by varying the area of the piston 44 or by any other adjustment varying the amount of air admitted to the motors 45 and 10 the termination of the first stage operation of the motor may be varied. In other words, by varying the gaseous pressure within the motor compartment 46 there is provided means for varying the degree of separation or degree of loading of the clutch plates, as the case may be, when the first stage of clutch engaging operation of the motor 10 is completed. It is to be noted the mechanism of my invention is preferably so constructed that this first stage of clutch engaging operation of said motor is completed before or at substantially the same time as the opening of the throttle is initiated and as a result of a relatively small degree of depression of the accelerator. This first stage operation of the motor 10 is completed very quickly and with a normal operation of the accelerator the driver may momentarily arrest the depression thereof when the resistance of the throttle return spring 145 is encountered; and this momentary arresting of the depression of the accelerator will suffice to insure a completion of the aforementioned first stage of clutch engaging operation of said motor before the throttle is opened.

To effect the step by step second stage of clutch engaging operation of the motor 10 the driver continues the depression of the accelerator thereby effecting a clockwise rotation of the bell crank lever 124 to open the throttle; and this operation of the accelerator serves to again effect a leftward movement of the rod 88 and a leftward movement of the valve member 30 the lever 36 again fulcruming about its pivotal connection with the pin 43. This operation, as with the above described first stage clutch engaging operation of the motor, serves to again place the clutch motor compartment 46 and the control compartment of the clutch motor 10 in communication with the atmosphere, thereby decreasing the gaseous pressure therein. The clutch springs then automatically resume their expansion to force the clutch plates into contact with each other. As before, if the driver arrests the movement of the accelerator after this resumption of movement of the valve member 30 said member again moves to its lapped position by virtue of a resumption of the expansion of the spring 47. In this valve lapping operation the direction of movement of the valve member 30 is again reversed, the lever 36 fulcruming about its connection with the pin 41. As with the above described first stage of clutch engaging operation of the mechanism the spring 47 expands to move the valve member 30 to its lapped position when the differential of pressure acting on the diaphragm 44 is reduced to a certain factor by the flow of air into the chamber 46. As with the first stage operation of the mechanism, the valve is lapped when the force biasing the pin 43 to the left equals the force biasing said pin to the right.

The clutch plates are thus first moved just short of engagement with each other and then pressed into contact, said latter operation being effected by a succession of steps if the driver chooses to depress the accelerator by a succession of steps; and he will probably do this if he desires to effect a slipping operation of the clutch. The latter operation is, of course, necessary in effecting a very slow movement of the car such as when parking the same. The first stage operation of the mechanism, that is, the operation to effect the relatively rapid movement of the clutch plates up to a point just short of engagement with each other, will, by virtue of the relatively fast movement of the valve member 30 and its degree of movement during the initial increment of movement of the accelerator, be effected very quickly. The second stage clutch engaging operation of my clutch control mechanism is effected more slowly inasmuch as the bell crank lever 124 is operated as a throttle operating lever of the first class, the levers 90 and 124 moving as a unit about the pin 126; and by virtue of this operation the degree of clutch engaging movement of the valve member 30 is relatively small compared to the degree of movement of the accelerator to effect said movement. It is also to be remembered that the first stage of clutch engaging operation of the clutch is, with a normal operation of the accelerator, completed before or at substantially the same time as the opening movement of the throttle is initiated; and it is to be noted that the opening of the throttle is continued as the second stage operation of the mechanism is effected.

The clutch being engaged and the accelerator partially depressed the driver then further depresses the accelerator to speed up the vehicle with the transmission established in low gear; and when the desired vehicle speed is attained the driver will then release the accelerator preparatory to establishing the transmission in a higher gear ratio setting.

Describing now the operation of the motor 23, that is, the operation of the mechanism constituting the essence of my invention, with a normal operation of the power plant and other driving mechanism of the car, including the clutch control mechanism of my invention, the clutch will be engaged in accordance with the degree of opening of the throttle, said operation progressively increasing the gaseous pressure within the compartment 46 of the motor 45; and with such an operation, the loading of the clutch plates is directly proportional to or substantially directly proportional to the speed of the engine. This result is particularly desirable inasmuch as the loading of the clutch plates should be in accordance with the degree of engine torque; for otherwise the engine might, for example, be stalled if the clutch is engaged too severely when the engine is operating at a relatively low speed.

However, the engine does not always respond to the opening of the throttle to increase the engine speed; for example, in cold or humid weather, or when the ignition system is not working properly, the speed of the engine is not increased as it should be with the depression of the accelerator; and this will probably result in a stalling of the engine inasmuch as with an operation of the motor 45 of my invention, the clutch plate loading is in accordance with the degree of depression of the accelerator. Expressed in other words, if the engine speed does not increase as it should with a certain throttle opening, then there will probably result an undesirable laboring of the engine which may ultimately cause it to stall.

Now, it is with such an untoward operation of the power plant that my invention is particularly concerned, for it will be noted that with the mechanism of my invention, the sleeve valve 28 will, with a sudden reduction of the water pressure in the compartment 23', be moved by the spring 59 to the left to effect a disengagement of the clutch. In this operation of my invention, the sudden reduction in engine speed effects a corresponding decrease in the water pressure within the compartment 23'; and this operation results in the expansion of the spring 59'. This operation of the valve may be defined as an overrule operation thereof. This reduction in loading of the clutch plates, that is, disengaging operation of the clutch, will take the load off the engine, thereby permitting it to speed up.

Describing another feature of the operation of the motor 23, if the engine R. P. M. becomes excessive during a normal engagement of the clutch and opening of the throttle; for example if the clutch should suddenly slip appreciably during the engagement thereof, then with the mechanism of my invention, the motor 23 will automatically come into play to move the valve sleeve 28 to the right, Figure 3, thereby effecting the desired increase in loading of the clutch plates; and this operation will result in a slowing down of the engine to effect the desired acceleration of the vehicle. In this operation, the increase in speed of the engine results in a corresponding increase in pressure within the compartment 23', resulting in the aforementioned clutch engaging rightward movement of the valve member 28.

There is thus provided, by the inclusion of the engine speed responsive water and spring operated motor 23, means for operating the valve 28, 30 to effect the desired engagement of the clutch despite an abnormal operation of the internal combustion engine of the vehicle. It is also to be noted that the mechanism of my invention may be so constructed and so adjusted that despite a maximum speed or despite a minimum speed of the engine, the complete engagement and disengagement of the clutch is insured. Explaining this operation, when the valve member 30 has been moved to the right, Figure 3, as far as it will go, that is, with a wide open throttle, the valve member 28 is at the time positioned to the right far enough to effect a venting of the motors 10 and 45 to the atmosphere; and when the valve member 30 has been moved to its extreme leftward position, the valve member 28 is at the time positioned to connect the motor 10 and 45 with a source of vacuum. If desired, stop members 42 and 42' may be connected, respectively, to the valve casing part 26' and to the rod 34 to limit the leftward movement, that is, clutch engaging movement, of the valve 30; and if desired, stops 30' and 10' may be connected, respectively, to the rod 34 and valve casing part 26' to limit the rightward movement, that is, clutch disengaging movement of the valve 30. Such a stop mechanism serves to limit the degree of movement of the valve member 30 so that the sleeve valve 28 does not have to move so far in effecting the above described overrule operation of the valve 28, 30.

There is thus provided, by the friction clutch control mechanism of my invention, power means for effecting the disengagement of the clutch when the accelerator is released to idle the engine and the transmission is established in any one of its low, reverse, or second gear settings; or when the accelerator is released to idle the engine, the vehicle is traveling below governor speed or is at rest, and the transmission is established in its high gear setting. In the latter clutch disengaging operation of the power means the accelerator, in its operation of the three-way valve 28, 30, cooperates with the governor in its operation of closing the switch 74 and the accelerator 118 in its operation of closing the switch 73, the latter operation being effected when the throttle is slightly opened thereby providing a means for driving the vehicle in high gear at a relatively low vehicle speed. As to the clutch engaging operation of the power means of my invention, said operation is effected, through the intermediary of the floating lever 36, by an operation of the accelerator and an operation of the valve operating motors 45 and 23. It is also to be noted that with the clutch control mechanism of my invention if the driver should fail to depress the accelerator to operate the valve 28, 30 just after the transmission is established in its high gear setting, that the bleed of air into the motor 10 via the duct 66 will nevertheless insure an engagement of the clutch. This operation of the mechanism might be effected if the transmission were placed in its high gear setting just before the vehicle started to descend a grade.

The follow-up mechanism of my invention which is the most important feature thereof, insures a two stage operation of the clutch motor and a resulting smooth engagement of the clutch, with any mode of operation of the accelerator; for the operation of the leverage changing force transmitting connections and the throttle spring 145 virtually insure this two stage operation of the mechanism when the clutch is engaged as a result of a normal operation of the accelerator. The floating lever 36 interconnecting the reciprocable valve member 30 with the accelerator operated pin 41 and the power elements of the valve operating motors 23 and 45, provide a very simple, yet effective, means for operating the three-way control valve 28, 30; the varying of the rate of the spring 47 provides a means for determining when the first stage of engagement of the clutch is completed; the particular force transmitting means interconnecting the throttle valve, the valve member 30 and the accelerator 118 insures a completion of the first stage of engagement of the clutch just as the throttle is opened or is about to be opened; the step by step clutch engaging or disengaging operations of the power element of the clutch motor insures the desired maneuvering of the vehicle in traffic or when the vehicle is being parked; and the operation of the motor 23 provides a means, cooperating with the accelerator, to effect a concurrent engine torque controlling means and accelerator position controlling means for determining the clutch plate loading operation of the clutch motor 10.

With the mechanism of my invention the motor 23 automatically comes into play to effect the desired loading of the clutch plates, the loading being automatically decreased when the engine fails to respond to the operation of the accelerator and automatically increased when the engine speed is excessive due, say, to a slippage of the clutch. It is desirable to load the clutch plates in accordance with the position of the accelerator pedal; and it is also desirable to make said loading a function of the engine torque. With the clutch control mechanism of my invention the clutch plate loading is a function of both of the aforementioned factors.

I claim:

1. Clutch control mechanism adapted to be included in the drive system of an automotive vehicle comprising an accelerator and an internal combustion engine, said clutch control mechanism including a pressure differential operated motor, valve mechanism, including a pressure balanced three-way valve, for controlling the operation of the motor; means, including means operative in accordance with the position of the accelerator, for controlling the operation of the valve mechanism and to effect a normal clutch disengaging and engaging operation of the motor; and means including a pressure differential operated motor, operative in accordance with the speed of the engine, for overruling the operation of the aforementioned valve controlling means, said overruling means coming into operation with an abnormal operation of the engine of the vehicle.

2. Clutch control mechanism adapted to be included in the drive system of an automotive vehicle including an accelerator and an internal combustion engine, said mechanism comprising a single acting pressure differential operated motor, valve mechanism for controlling the motor including a pressure balanced follow-up three-way valve; means, including means actuated by the accelerator and a spring and pressure differential operated motor, for controlling the operation of the three-way valve; and a fluid pressure and spring operated motor for actuating a part of the three-way valve to supplement the operation of the aforementioned valve actuating means.

3. Clutch control mechanism adapted to be included in the drive system of an automotive vehicle comprising a single acting pressure differential operated motor, valve mechanism for controlling the motor including a pressure balanced follow-up three-way valve comprising a reciprocable spool valve member and a reciprocable sleeve valve member; means, including means actuated by the accelerator and further including a spring and pressure differential operated motor, for controlling the operation of the three-way valve, said control including an actuation of the spool valve member; and a fluid pressure and spring operated motor for actuating the sleeve valve member to supplement the operation of the aforementioned valve actuating means.

4. Clutch control mechanism adapted to be included in the drive system of an automotive vehicle comprising a friction clutch, an accelerator, and an internal combustion engine having an intake manifold, said clutch control mechanism including a pressure differential operated motor operably connected to the clutch, valve mechanism for controlling the operation of the motor including a casing and two relatively movable valve members housed within the casing, fluid transmitting means interconnecting the intake manifold with the casing, fluid transmitting means interconnecting the motor with the valve casing, means, including accelerator operated means, and a spring and pressure differential operated motor, for actuating one of the valve members, and means, including a spring and pressure differential operated motor, for actuating the other valve member.

5. Mechanism for operating the friction clutch of an engine driven vehicle comprising a fluid pressure motor, a three-way valve for controlling the operation of said motor including a movable sleeve valve member and further including a follow-up type of pressure balanced reciprocable valve member; and means for actuating said latter valve member including foot operable means and a spring and pressure differential operated motor; together with a fluid pressure operated motor operable in accordance with engine speed and operative to actuate the sleeve valve member.

6. Mechanism adapted to operate the friction clutch of an engine driven vehicle comprising a fluid pressure motor, valve means for controlling the operation of said motor including a pressure balanced reciprocable spool valve member and a reciprocable sleeve valve member movable relative to the spool valve member, and means for controlling the operation of said pressure balanced valve member including a lever member pivotally connected to the latter valve member, foot operable means connected to one end of said lever member and operable, through the intermediary of the lever member, to move said latter valve member, a spring and pressure differential operated motor for moving said latter valve member said motor also being connected to the lever member, and a spring and fluid pressure operated motor operable in accordance with engine speed and operative to actuate the sleeve valve member.

7. Mechanism for operating the driven element of the friction clutch of an engine driven vehicle comprising a fluid pressure motor adapted to be connected to said driven element, valve means for controlling the operation of said motor including a reciprocable spool shaped valve member and a ported sleeve valve member, a lever member pivotally connected to one end of the spool shaped valve member, foot operable means pivotally connected to one end of the lever member, a spring and pressure differential operated motor including a power element operably connected to the other end of the lever member, a spring and water pressure operated motor including a power element operably connected to the sleeve valve member, a spring within the water pressure operated motor said spring serving to render said motor operable as a control means to effect a clutch disengaging movement of the driven element of the clutch when and only when the engine of the vehicle fails to respond to an opening of the throttle of the vehicle.

EDWIN E. PRATHER.

References Cited in the file of this patent

UNITED STATES PATENTS

| Number | Name | Date |
|---|---|---|
| 1,964,693 | Hill | June 26, 1934 |
| 2,296,282 | Hruska | Sept. 22, 1942 |
| 2,365,470 | Ingres | Dec. 19, 1944 |